United States Patent [19]

Sato

[11] Patent Number: 4,565,027
[45] Date of Patent: Jan. 21, 1986

[54] BASKET FOR CATCHING FISH AND THE LIKE

[76] Inventor: Megumi Sato, 423 Ohaza Nanatsuie, Yanagawa-shi, Fukuoka, Japan

[21] Appl. No.: 668,949

[22] Filed: Nov. 7, 1984

[51] Int. Cl.$^4$ ............................................. A01K 69/08
[52] U.S. Cl. ........................................ 43/102; 43/105
[58] Field of Search ................. 43/100, 101, 102, 103, 43/104, 105, 7, 8, 10, 12, 14

[56] References Cited

U.S. PATENT DOCUMENTS

| | | | |
|---|---|---|---|
| 3,786,593 | 1/1974 | Gerbrandt | 43/100 |
| 3,903,637 | 9/1975 | Dorsey | 43/105 |
| 4,411,092 | 10/1983 | Lalancette | 43/100 |

FOREIGN PATENT DOCUMENTS 500201  12/1919  France .................................. 43/12

Primary Examiner—Nicholas P. Godici
Assistant Examiner—M. Jordan
Attorney, Agent, or Firm—Brisebois & Kruger

[57] ABSTRACT

This invention relates to a basket for catching fish and the like while being sunk into the sea, which is mainly composed of a collapsible basket member consisting of a net portion stretched around movable frame members, such that the unfolded basket is used for alluring and catching fish and the like and the volume will be reduced by folding it when not used for convenience of conveyance and storage. Stretching strings are disposed between an inner entrance frame for widening the inner end of an exit checking portion which is an opening for fish to the inside of the basket and the base ring, such that due to the tension of the net portion which incorporates the opening and the tension of the stretching strings, the exit checking portion is defined with the inner entrance frame when the basket is unfolded and when the basket is folded the inner entrance frame is kept in parallel with the folded movable frame members while the tension of the net portion of the opening is retained. To the end of the exit checking portion is connected a cylindrical net which is tapered toward the end and the end of which is left cut.

1 Claim, 6 Drawing Figures

BASKET FOR CATCHING FISH AND THE LIKE

BACKGROUND OF THE INVENTION

This invention relates to a basket for catching fish and the like.

Conventionally a fish basket for catching fish and the like is composed of a net member and folding frame members for convenience of conveyance and storage.

In the folding fish basket described above, however, the position and the direction of the inner entrance frame which defines an exit, an exit checking portion of an entrance for fish and the like are insecure in the folded state, which involves a danger of producing folds or creases in the net portion which incorporates the entrance. Particularly in a fish basket the net portion of which is made of monofilament for the purpose of reducing adhesion of extraneous matter, the folds and the creases remain for a long time after the net is unfolded, which makes fish too cautious to be allured and caught.

SUMMARY OF THE INVENTION

Accordingly, it is an object of the invention to provide a basket for catching fish and the like which can prevent the generation of folds and creases in the net portion of an opening, by widening the inner end of an exit checking portion of the opening with the inner entrance frame at the time of unfolding the basket and by keeping the inner entrance frame in parallel with the folded frame members while retaining the above tension at the time of folding the net, due to the tension of strings which are stretched between the frame members and the inner entrance frame and the tension of a net portion which incorporates the opening.

BRIEF DESCRIPTION OF THE DRAWINGS

This and other objects as well as advantages of the present invention will become clear by the following description of a preferred embodiment of the present invention with reference to the accompanying drawings, wherein.

DETAILED DESCRIPTION OF A PREFERRED EMBODIMENT

This invention can prevent the generation of folds and creases in the net portion of an opening, by widening the inner end of an exit checking portion of the opening with the inner entrance frame at the time of unfolding the net and by keeping the inner entrance frame in parallel with the folded frame member while retaining the above tension at the time of folding the net, by virtue of the tension of strings which are stretched between the frame members and the inner entrance frame and the tension of a net portion which incorporates the opening.

Hereinunder, an embodiment of the invention will be described, but apart from this embodiment various changes may be made without departing from the spirit of the invention, such as a basket with a plurality of entrances or a basket wherein the shape of the frame member is substantially square.

Figure 1:
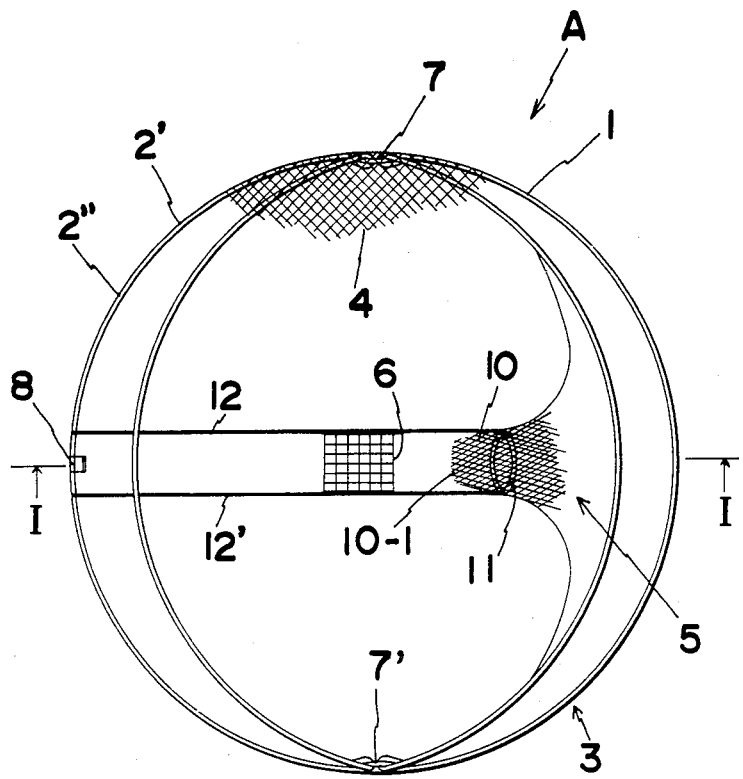
FIG. 1 is a plan view of a basket for catching fish and the like according to the invention in its unfolded state.
Figure 2:
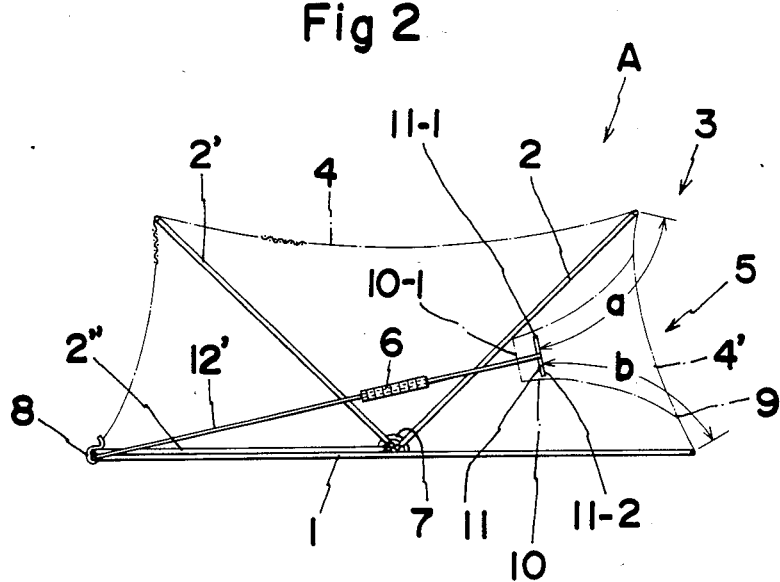
FIG. 2 is a sectional view taken along the line I—I of FIG. 1.
Figure 3:
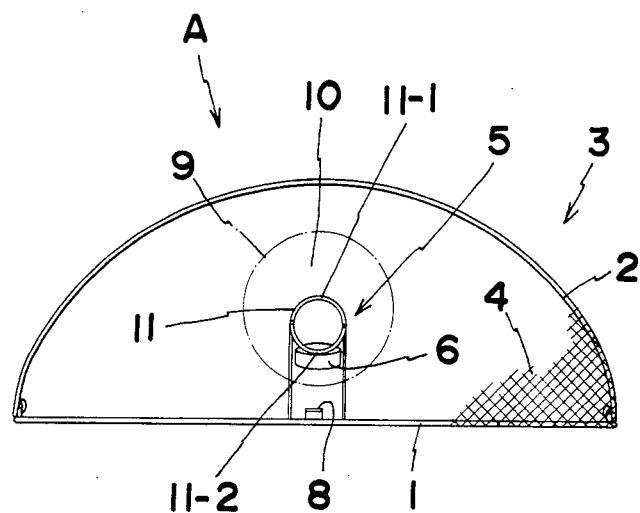
FIG. 3 is a front view of FIG. 2.
Figure 4:
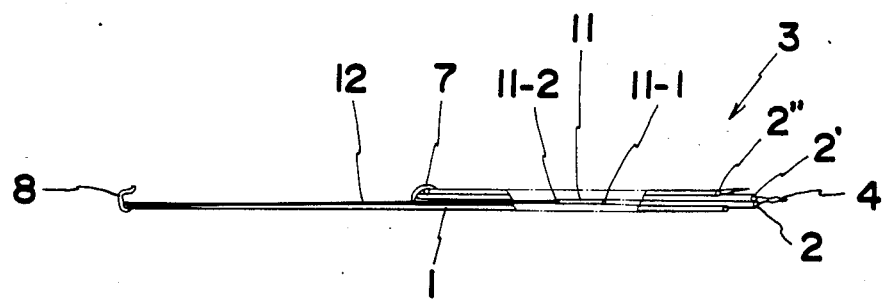
FIG. 4 is a side sectional view of the basket while being folded.
Figure 6:
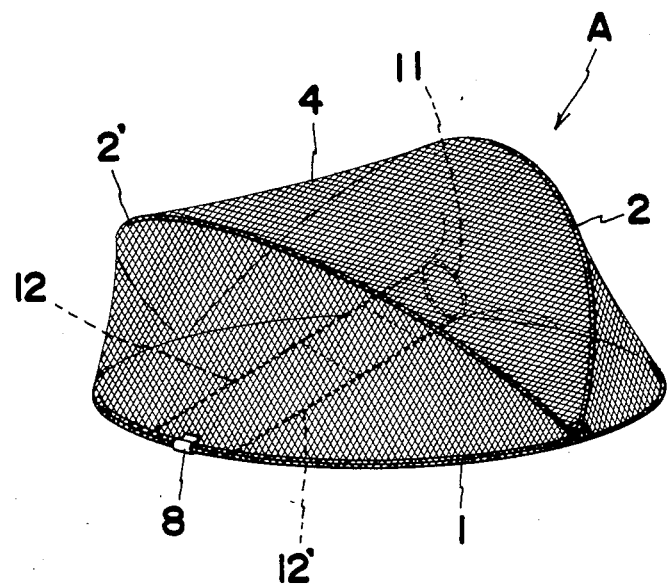
FIG. 6 is a perspective view of the basket for catching fish and the like according to the invention.
Figure 5:
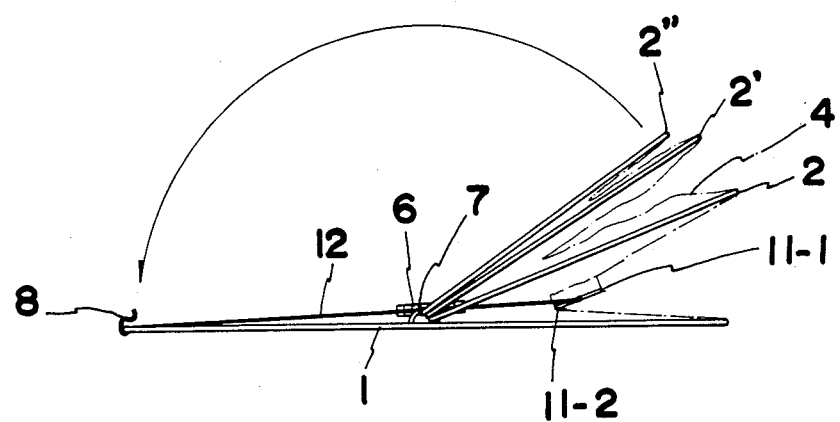
FIG. 5 is a side sectional view of the basket after being folded.

FIG. 1 is a plan view of a basket for catching fish and the like according to the invention in its unfolded state and in which (A) represents a basket for catching fish and the like, which is composed of a circular base frame (1); a three-member frame (3) consisting of three movable frame members (2), (2') and (2''), a net portion (4) which is wrapped around the circular base frame and the three-member frame; an entrance portion (5) for fish and the like provided on one side surface of the net portion (4); and a bait container (6) which contains bait for aluring fish and the like.

The circular base frame (1) consists of a steel bar having a predetermined weight formed into a substantially circular configuration, the weight of which also serves as a sinker, and on both sides of the circular base for the three-member frame (1) right and left supporting rings (7) (7') are provided.

The movable frame members (2), (2'), (2'') are each made of a steel bar formed into a substantially semi circular arc. The diameter of the rearmost three-member frame member (2'') is substantially the same as the diameter of the base ring (1), and the diameters of the other movable frame members (2), (2') are slightly larger than the diameter of the base ring (1). The right and left end portions of each of the movable frame members are supported by the right and left supporting rings (7), (7') such as to be rotatable forwardly and backwardly.

Under the state of using the basket (A), the rearmost three-member frame member (2'') is removably retained onto the rear half portion of the circular base frame (1) with a hook (8) disposed on the circular base frame (1) while being in close contact with the rear half portion, and the other three-member frame members (2), (2') are fixed at the positions of about 45° upward from the fore and rear portions of the circular base three-member frame by making use of the tension of the net (4) which enwraps the three-member frame (3).

The entrance portion (5) is provided on one side surface of the net (4), namely, the side surface (4') of the net surrounded by the foremost movabler frame member (2) and the rear half portion of the circular frame base (1).

The entrance portion (5) provides a substantially circular opening (9) on the side surface of the net (4'), and on the inner periphery of the opening (9) is disposed the inner part of the entrance portion (5) which is tapered toward the inside of the basket (A). To the inner part of the entrance portion (5) the base end of an exit checking portion (10) is connected and the inner part (10 - 1) of the exit checking portion (10) is extended inwardly, left in a free state after the net which incorporates the exit checking portion has been cut.

At the joint of the entrance portion (5) and the exit checking portion (10) is provided an inner entrance frame (11) for defining the entrance portion (5), the exit checking portion (10) and its inner part (10 - 1). On the right and the left sides of the inner entrance frame (11), respectively, ends of right and left stretching strings (12) (12') are connected, and the other ends of the strings (12) (12') are connected to the rear end portion of the base ring (1), thus pulling the exit checking portion (10) in the inward direction of the basket (A) with a predetermined tension.

The shortest distance (a) from the upper end (11 - 1) of the inner entrance frame (11) through the upper portion of the entrance portion (5), the upper edge of the opening (9) and the upper portion of the side surface (4') of the net portion to the upper end of the foremost movable frame member (2) and the shortest distance (b) from the lower end (11 - 2) of the inner entrance frame (11) through the lower portion of the entrance portion (5), the lower edge of the opening (9) and the lower portion of the side surface (4') of the net portion to the fore end of the base ring (1) are substantially equal. Therefore, the upper and lower ends (11 - 1) and (11 - 2) of the inner entrance frame (11) are pulled outwardly with substantially equal tensions, whereby the inner part (10 - 1) of the exit checking portion (10) is widened inwardly up to the full diameter of the inner entrance frame (11).

A bait container (6) is made into a flat basket and disposed midway between the right and the left stretching strings (12), (12') while the basket (A) is being used.

The basket (A) is folded by releasing the hook (8), rotating the rearmost movable frame member (2") in the forward direction of the base ring (1) so as to set the gap between the movable frame member (2") and the rear portion of the base ring (1) free, and thus objects which have been caught may be taken out. If the movable frame member (2") is rotated further in the forward direction of the base ring (1), the three movable frame members (2), (2') and (2") are gathered together above the front portion of the base ring (1), and the basket (A) is folded into a substantially circular plane configuration which is convenient for conveyance and storage.

In the folded state, the inner entrance (11) is housed in substantially the same plane as the circular base three-member frame (1) with the upper end (11 - 1) facing outward and the lower end (11 - 2) facing inward, because the diameter of the foremost movable frame member (2) is larger than that of the base ring (1), the upper end of the movable frame member (2) is located at a position outward of the forward end of the circular base three-member frame (1), the lengths (a) and (b) are substantially equal as described above, and the right and left sides of the inner entrance frame (11) are pulled inwardly by the stretching strings (12), (12'). In addition, since a tension in the direction in which fish and the like enter is applied to the entrance portion (5) by the left and the right stretching strings (12), (12') even in the folded state. An exit checking portion (10) which is the extension of the entrance portion (5) is arranged to lay in the same direction as the entrance portion (5), which prevents the generation of disadvantageous folds or creases in the an exit checking portion (10).

It is possible to make the diameter of the three-member frame member (2) of the entrance portion (5) smaller than that of the circular base three-member frame (1) such as to allow the upper end (11 - 1) of the inner entrance frame to be folded inwardly and the lower end (11 - 2) outwardly.

This invention, which prevents the generation of folds or creases in the opening and the check portion for fish and the like which act as obstacles to the luring and catching of fish and the like, effectively increases a potential catch.

What is claimed is:

1. A basket for catching fish and the like comprising: a basket member composed of a substantially circular base frame, substantially semi-circular right and left supporting rings disposed at diametrically opposite positions of said circular base frame, a three-member frame composed of a plurality of semi-circular movable frame members both ends of which are supported by said supporting rings such as to be rotatable forwardly and backwardly around said supporting rings and at least two of which are rotatably disposed at positions above and equally distant from said circular base frame, and a net portion which is stretched around the outer peripheral surface of said three-member frame; an opening for fish and the like provided on a side surface of said basket member; an entrance portion made of a net portion which is extendingly connected to the inner periphery of said opening and which is tapered such as to become narrower and narrower from the inner periphery of said entrance portion toward the inside of said basket member; an inner entrance frame disposed at the inner end of said entrance portion for defining said inner end of said entrance portion; an exit checking portion made of a net portion which is extendingly connected from said inner end to the inside of said entrance portion such that the end of said exit checking portion remains in a free state by cutting said net portion which incorporates said exit checking portion; and a hook for allowing said basket to be freely unfolded and folded and for retaining at least one movable frame member on said circular base frame.

* * * * *